United States Patent [19]

Pollitt et al.

[11] Patent Number: 5,109,968
[45] Date of Patent: May 5, 1992

[54] CLUTCH OSCILLATOR ASSEMBLY

[76] Inventors: Gary M. Pollitt, 45050 Cameron St., Temecula, Calif. 92390; Anthony R. Orosco, 3320 N. Millbrook, Fresno, Calif. 93726

[21] Appl. No.: 771,209

[22] Filed: Oct. 4, 1991

Related U.S. Application Data

[63] Continuation-in-part of Ser. No. 663,724, Mar. 4, 1991, abandoned.

[51] Int. Cl.$^5$ .............................................. F16D 19/00
[52] U.S. Cl. ........................................ 192/83; 192/20; 192/84 C; 192/101
[58] Field of Search ...................... 192/83, 84 R, 85 C, 192/90, 101, 20; 74/625

[56] References Cited

U.S. PATENT DOCUMENTS

| | | | |
|---|---|---|---|
| 2,272,500 | 2/1942 | Andres et al. | 192/83 |
| 3,438,473 | 4/1969 | Rohrbacher | 192/83 |
| 4,637,503 | 1/1987 | Vohl | 192/83 |
| 4,865,173 | 9/1989 | Leigh-Monstevens et al. | 192/90 X |
| 4,951,789 | 8/1990 | Murata et al. | 192/101 X |

Primary Examiner—Leslie A. Braun
Assistant Examiner—Andrea Pitts
Attorney, Agent, or Firm—John J. Murphey

[57] ABSTRACT

In an engine-powered wheeled vehicle, having a clutch interposed the engine and the drive wheel, actuated through a clutch cable operated by a moveable engaging/disengaging clutch handle, a clutch oscillator assembly including a chassis for mounting on the vehicle intermediate the clutch and the clutch handle, a shaft supported on the chassis for powered rotation about a fixed axis, a switched for interrupting the power to the shaft to cause controlled rotation thereof, a cyclic drive in association with the shaft for alternately pulling and releasing the clutch cable as a function of rotation of the shaft and including a work plate pivotally mounted on the chasis arranged to be driven by the shaft and further including a lever pivotally mounted on the chassis having one end in releasable contact with the clutch cable, wherein the cyclic drive includes a post mounted on the work plate, spaced-apart from the pivotal mounting thereof, and adapted to move as the work plate is turned, to create rhythmic contact between the post with a portion of the lever, to move the lever and cause the clutch cable to be pulled to disengage the clutch during part of the rotation of the work plate, and further including a notch formed in the lever for passage of the post therethrough and out of contact with the lever, during another part of the rotation of the work plate, to release the clutch cable and allow the clutch to immediately re-engage.

22 Claims, 6 Drawing Sheets

CLUTCH OSCILLATOR ASSEMBLY

CROSS-REFERENCE TO OTHER PATENT APPLICATIONS

This is a continuation-in-part of our patent application, having the same title, previously filed on Mar. 4, 1991, and carrying serial number 07/663,724 now abandoned.

BACKGROUND OF THE INVENTION

1. Field of the Invention

This invention pertains to the field of clutch-engaging mechanisms. More particularly, it is a device for rapidly engaging and disengaging a clutch in an engine-powered, wheeled vehicle to provide power to the drive wheels without shifting to a higher gear ratio (lower gear).

2. Description of the Prior Art

An engine is generally defined as a device for converting one form of energy into another, usually into mechanical motion. A windmill converts wind velocity to rotary or reciprocating mechanical motion; an electric motor converts electricity to mechanical energy, and a combustion engine converts the chemical energy of a fossil fuel to mechanical motion. In the conversion of hydrocarbon fuel, such as gasoline, to the rotary mechanical motion of the drive wheels, such as in an automobile or motorcycle, the internal combustion engine displays the characteristic of outputting torque or power as a direct function of engine speed or revolutions per minute (rpm) of the engine crankshaft.

It is common to interpose a device, called a transmission, between the engine output shaft and the drive wheel axle in order to change the ratio of turns of the engine shaft to turns of the axle so that the appropriate amount of torque may be provided to the drive wheels for a given situation. For instance, in starting a vehicle from a stop or turning it through a curve, a large amount of torque is needed at the drive wheels. The ratio of shaft to axle-turning rate is raised to allow more engine shaft turns per turn of the axle to provide this increase in required torque; this is generally described as shifting to a "lower gear" even though the ratio is large, such as 16 turns of the engine shaft per turn of the axle. In contrast, in high-speed cruise, the ratio is lowered to allow fewer turns of the shaft per turns of the axle, such as a ratio of four-to-one, to provide the appropriate torque to the drive wheels while preventing the engine from over-speeding. The gear ratio changes are made in the transmission which is a box or container of various diameter gears that are intermeshed in these various ratios through the use of levers.

A clutch is interposed between the engine shaft and the transmission. Its function is to disconnect, on command, the shaft from the transmission gears to allow them to be moved about inside the transmission free of mechanical stress applied from the engine. As is commonly practiced, one disengages or opens the clutch prior to shifting the gears in the transmission and then engages or closes the clutch after shifting is accomplished to re-connect the engine, through the transmission, to the drive wheels.

In the field of motorcycles, the engine is made quite small for various reasons, including reducing the overall weight of the motorcycle and presenting a small silhouette to lessen wind resistance. The characteristic of low-torque at low-engine rpm—high-torque at high-engine rpm is particularly noticeable in these small engines mainly because of the smaller overall engine size and the inherently reduced diameter of the cylinders where conversion of fuel energy to mechanical energy takes place. Much shifting is therefore needed to provide the appropriate torque for the particular situation encountered by the motorcycle driver.

In racing motorcycles, time is quite precious; seconds or parts of seconds may spell the difference between winning or losing. Much effort is expended to reduce the time involved in engine speed changes or transmission shifting to permit engine torque to be applied to the drive wheel for as long a time as possible. When the motorcycle is cruising in a straight path, where high speed is obtained through a low-gear ratio, and thereafter directed out of that straight path into a turn, increased torque is needed to power it into and through the curve. Down shifting to a higher engine shaft to drive-axle ratio requires the time-consuming job of disengaging the clutch, shifting the transmission gears, lowering the engine speed and re-engaging the clutch. This is a time-wasting procedure.

A method of obtaining the required amount of torque without resorting to the time-consuming shifting operation has been discovered wherein the rider rapidly activates the handle bar-mounted clutch disengagement-engagement lever through a series of disengagement-engagement cycles while maintaining the throttle open to provide the highest engine speed. When the clutch is disengaged, i.e., the clutch handle is squeezed, the engine races at high rpm. Without shifting out of the low engine shaft to axle ration ("high" gear), the clutch is rapidly engaged, i.e., the handle is released and the energy is transmitted from the high-speed engine through the transmission to the rear drive wheel. Because the gear ratio is still quite low, the engine quickly loses rpm and the torque or power delivered to the drive wheel rapidly diminishes. By quickly squeezing the clutch lever, the engine is free to rapidly speed up and gain further momentum. Accordingly, by continuing to cycle the clutch at high-engine rpm will provide a stream, albeit in short-lived parcels, of energy to the drive wheels and the necessary torque to power the motorcycle through the turn or other power-requiring maneuver without undergoing the time-consuming transmission gear-changing operation. This cycling operation has proven successful in motorcycle racing.

Unfortunately, the rapid cycling of the clutch handle is distracting to the motorcycle racer because it takes some of his/her attention away from steering the vehicle through the curve. Such a loss of attention may create a hazard to the safe-handling of the motorcycle in the stressful and tension-filled activity taking place on the racetrack. A slight miscalculation, by the driver, may cause the loss of motorcycle position in the race that will undo the advantage gained by the clutch-cycling process.

SUMMARY OF THE INVENTION

This invention is a mechanism that will automatically process the clutch through a series of engagement-disengagement-engagement cycles and relieve the driver from this attention-robbing procedure. The process is started and stopped by use of a switch mounted within easy reach of the driver's thumb so that it may be instituted without detracting from the driver's hold on the handlebars. The process is based upon an electrically-driven work plate that interacts with a means to provide a rhythmic reciprocating movement to the cable extending between the clutch handle and the clutch. When the process is terminated, by the driver releasing the switch or otherwise, this invention insures that the mechanism stops at a position where the clutch is fully engaged. Another feature of this invention is that it permits full utilization of the clutch lever by the driver during the race, even during the automatic cycling process. In tests it has been shown that the racing driver obtains a noticeable advantage in turning about the race track using this invention without detracting his/her attention from driving the racer and without bringing the motorcycle into an unsafe environment. In another embodiment of the invention, a lever, pivotally mounted at one end, carries the clutch cable and is oscillated by a rotating cam lobe to produce the cycling action. In still another embodiment, a piston carries the clutch cable and is oscillated by a rotating cam lobe to produce the cycling action.

Accordingly, the main object of this invention is a mechanism to automatically cycle the clutch through a series of disengaging-engaging-disengaging movements to provide, over a short time-period, power to the drive axle without having to shift the transmission to a higher-gear ratio (lower gear). Other objects of this invention include a device that may be activated by the driver using his/her thumb or other digit without loosening or otherwise shifting their grip on the handlebar; a device that always provides full engagement of the clutch when it is stopped; a device that permits full control over the clutch via the clutch handle during operation of the motorcycle; and, a clutch that is amenable to be mounted on a wide variety of motorcycles.

These and other objects of the invention will become more apparent when reading the description of the preferred embodiment taken together with the drawings attached hereto. The scope of protection sought by the inventors may be gleaned from a fair reading of the claims that conclude this specification.

DESCRIPTION OF THE PREFERRED EMBODIMENT

Figure 1:
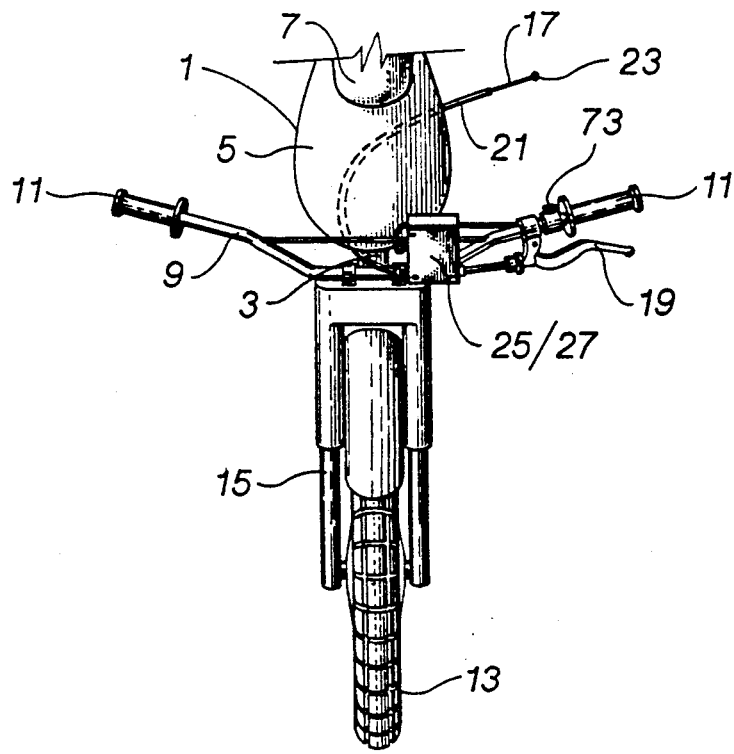
FIG. 1 is a top illustrative view of a front portion of a typical motorcycle showing the preferred embodiment of this invention mounted in place on the handle bars.

As shown in the drawings wherein like elements are identified with like numerals or their primes throughout the twelve figures, the front part of a typical motorcycle 1 is shown to comprise a frame 3 that supports a fuel tank 5 positioned over top of an engine (not shown) but upon which is mounted a seat 7 on which the motorcyclist positions himself or herself. Steering is accomplished through the use of a handle bar 9, having spaced-apart terminal hand-grips 11, said handle bar being attached to the front steerable wheel 13 through a fork 15. A clutch cable 17 extends from a squeezable clutch-engaging/disengaging handle 19, attached near one end of the handle bars 9 adjacent grips 11, and proceeds outward to the clutch unit (not shown) located in the engine compartment. For clarity, however, clutch cable 17 is shown pulled away from the clutch unit and extended out the side underneath fuel tank 5. Clutch cable 17 is encased in a cable sheath 21 and is terminated by a plug or fitting 23 that connects to the clutch. Cable 17 is normally biased to engage the clutch. Handle 19 is arranged to be squeezed to overcome this bias and withdraw cable 17 to temporarily disengage the clutch. The invention is mounted on a chassis 25 and sealed by a cover 27 that are shown in FIG. 1 to be mounted to handle bar 9 by known means, such as screw, bolts, etc., positioned intermediate the clutch unit and clutch handle 19.

Figure 2:
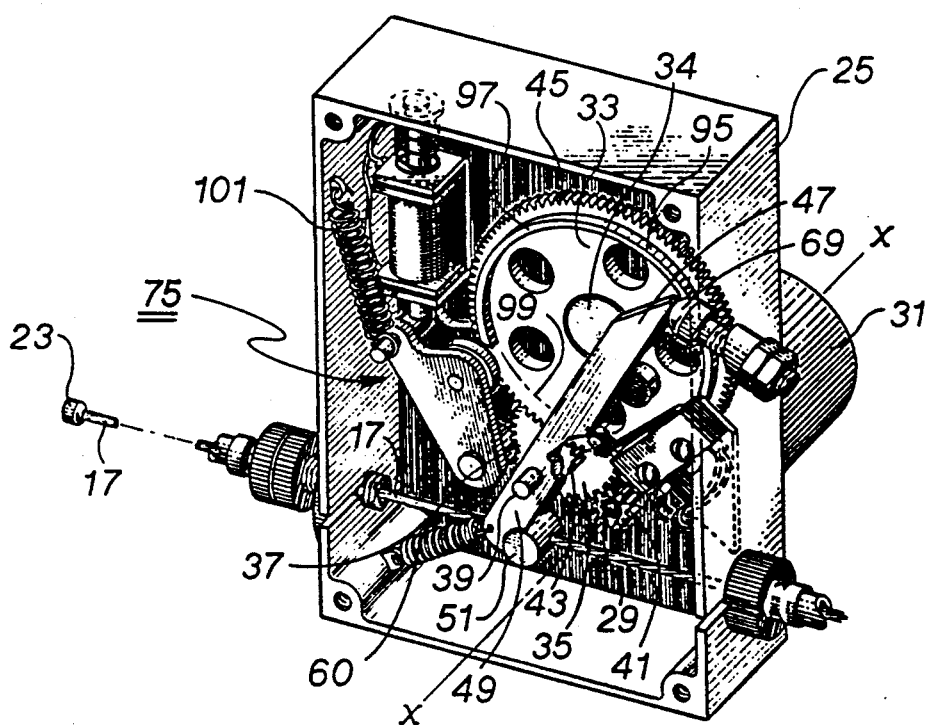
FIG. 2 is a front trimetric illustrative view of one of the embodiments of the invention, with the cover removed and the oscillator assembly at its initial or rest position.
Figure 3:
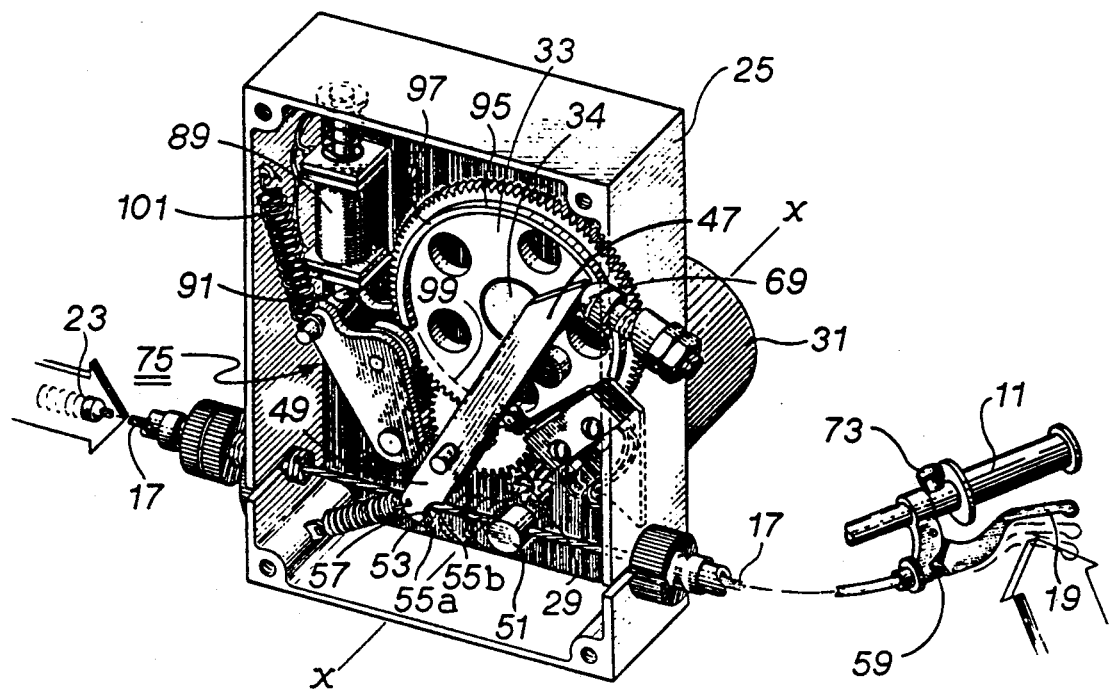
FIG. 3 is the same view as FIG. 2 showing how the squeezable clutch handle may be used independent of the oscillator assembly of this invention.

Turning to FIGS. 2 and 3, a shaft 29 is shown supported on chassis 25 for powered rotation about a fixed axis x—x, through a drive motor 31 such as an electric motor. A work plate 33, preferably circular in shape, is pivotally mounted in a journaled bearing 34 attached to chassis 25 spaced-apart from shaft 29 and on the opposite side of work plate 33 from drive motor 31. A gear wheel 35, on which is formed about the periphery thereof a series of gear teeth 37, is pivotally mounted on chassis 25 by a shaft 39. A series of gear teeth 41 are formed on shaft 29 and arranged to engage gear teeth 37 for powered rotation by drive motor 31. Another set of gear teeth 43 is formed on gear wheel 35, spaced-apart from gear teeth 37, and is adapted to engage a set of gear teeth 45 formed on work plate 33 and preferably about the outer circular periphery thereof. In this fashion, drive motor 31 may be designed very small and with a high output rpm; it will deliver a substantial amount of torque through ratios of gears 41/37 and 45/43 to power work plate 33 in rotary motion.

A lever 47 is pivotally mounted on shaft 39, said lever including a first end 49 arranged in releasable contact with clutch cable 17. One manner of providing this releasable contact is shown in FIG. 3 to include a cross-pin 51 mounted on clutch cable 17. A split-fingered pawl 53 is formed on first lever end 49 and includes a pair of spaced-apart fingers 55a and 55b arranged to straddle clutch cable 17 and receive cross-pin 51 in a recess 57 formed therein. By this arrangement, the clutch is always free to be disengaged by squeezing clutch handle 19 (as shown by the arrow) to withdraw cross-pin 51 from recess 57, even during the cyclic action of lever 47. A spring 59 is connected to handle 19 to bias cable 17 and cross-pin 51 toward the clutch unit to help insure engagement of the clutch when the releasable contact of lever 47 is relaxed.

Figure 4:
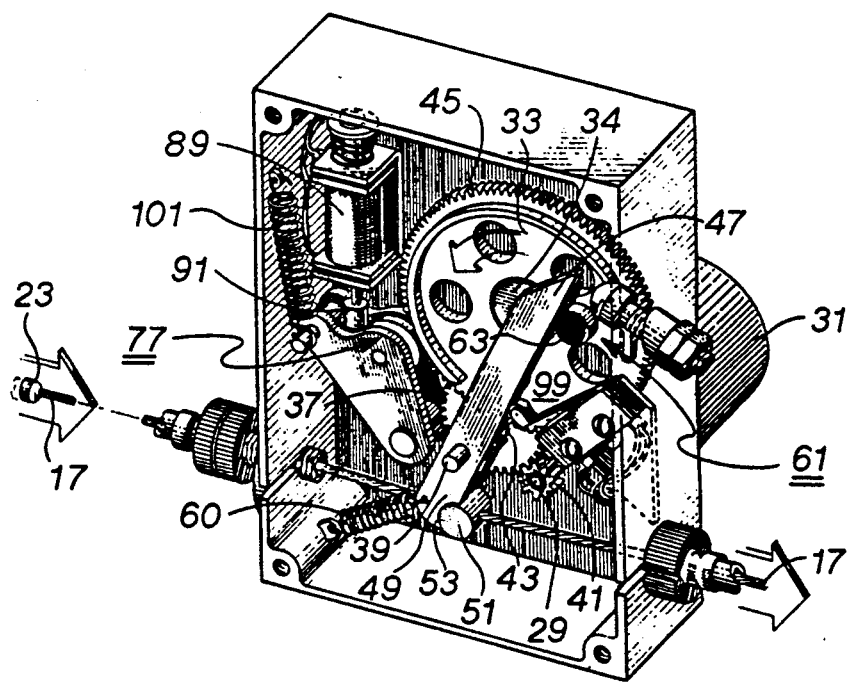
FIG. 4 is the same view as FIG. 3 except that the oscillator assembly is shown at the beginning of its cycle stroke.
Figure 5:
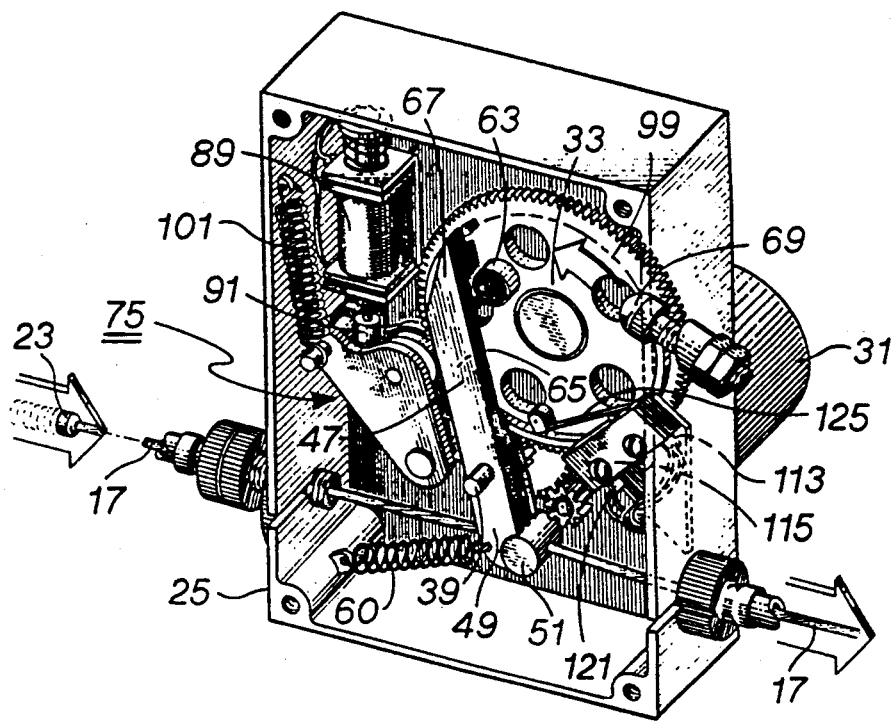
FIG. 5 is the same illustrative view as in FIG. 4 showing further movement of the oscillator assembly.
Figure 6:
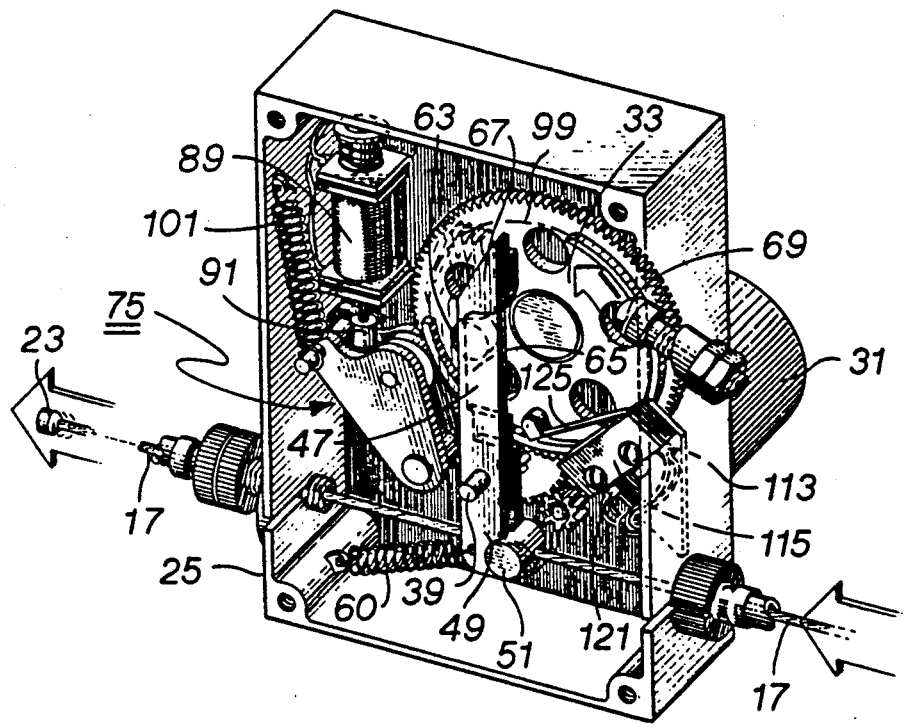
FIG. 6 is the same view as in FIG. 5 showing the oscillator assembly completing the oscillating cycle.

As shown in FIGS. 4 through 6, a cyclic means 61 is formed in association with work plate 33 to move first lever end 49 back and forth to cause pawl 53 to alternately pull and release clutch cable 17 as a function of the rotation of work plate 33 (see arrows on clutch cable 17). This is accomplished by providing a post 63, see FIG. 4, mounted on work plate 33, spaced-apart from journal bearing 34, to rotate at a fixed radius about bearing 34 as work plate 33 is rotated by shaft 29 through gears 41, 37, 43 and 45. Post 63 contacts lever 47 on the opposite side of gear wheel mounting shaft 39 from first lever end 49, as work plate 33 rotates in the direction of the arrow (see FIGS. 4, 5 and 6) and forces lever 47 to pivot about pin 39 in a counterclockwise direction so that pawl 53 engages cross-pin 51 and pulls clutch cable 17 to the right, as shown by the arrows, to disengage the clutch. This motion is continued (see FIG. 5) and lever 47 is pivoted across journal bearing 34 to the left side of work plate 33.

A notch 65 is formed on the underside of lever 47, beginning near shaft 39 and terminating near second end 67 of lever 47. When post 63 reaches notch 65 (see FIG. 6) it slides through said notch and passes under lever 47. The normal bias on clutch cable 17, aided by spring 59, urges cable 17 toward the clutch unit to re-engage the clutch. A spring 60 interconnected lever end 49 and chassis 25, urges the rotation of lever 47 clockwise, as shown in phantom in FIG. 6, back into its initial preset position as shown in FIG. 3. As work plate 33 continues to rotate, post 63 swings through the opening of notch 65 under lever 47 and back around to its initial position (see FIG. 3) to once again contact lever 47 outside of notch 65, to repeat the pulling action on clutch cable 17 as work plate 33 continues to rotate. Accordingly, as motor 31 drives work plate 33 in its rotary motion, post 63 causes lever first end 49 to oscillate back and forth and cycle the clutch between full engagement and disengagement. A stop 69 is mounted on chassis 25 on which lever second end 67 bottoms after being released by post 63.

Figure 7:
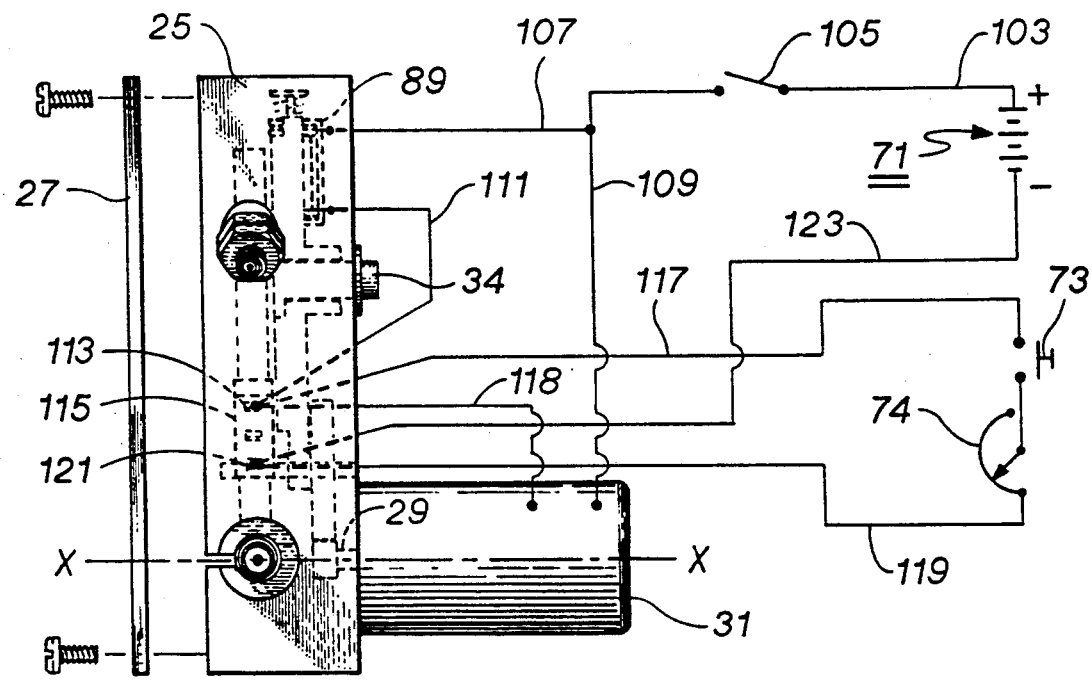
FIG. 7 is a side elevation view and partially schematic view of the embodiment shown in FIG. 2.

Drive motor 31 may be hydraulic or electric and both are contemplated in this invention. Shown in FIG. 7 is one embodiment of a schematic diagram for use where motor 31 is electrically driven. This electric system is powered by a power means 71 that may include the motorcycle battery or comprise a separate battery. Electric power to drive motor 31 is controlled by a normally-open, single-pull, single-throw switch 73. A variable rheostat 74 is connected in series with switch 73 to allow the driver to control the current passing to drive motor 31 and hence control the speed of the cycling action. To ensure that clutch cable 17 is released by pawl 53 when power to drive motor 31 is cut off by switch 73, a positional-power shut-off means 75 is provided to cause work plate 33 to rotate to a preset position where post 63 is out of contact with lever 47 and lever second end 67 is resting against stop 69, as shown in FIG. 3.

Figure 8:
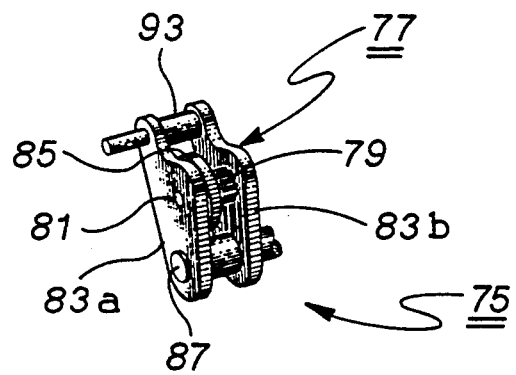
FIG. 8 is a detailed view of one portion of the brake assembly that is shown in FIG. 2.

Means 75 includes a brake means 77 in the form of a small gear wheel 79 (see FIG. 8) mounted on a shaft 81 spanning between a pair of brake plates 83a and 83b. An idler wheel 85 is also mounted on shaft 81 between brake plate 83a and gear wheel 79. Plates 83a and 83b are pivotally mounted on a pin 87, spaced apart from shaft 81, that is attached to chassis 25. A solenoid coil 89 is mounted on chassis 25 with a reciprocally mounted solenoid plunger 91 arranged to contact a pin 93 spanning plates 83a and 83b so as to pivot the plates toward and away from work plate 33 and cause gear wheel 79 to engage gear teeth 45 located about the periphery of work plate 33 during certain portions of the cycling of clutch cable 17.

Gear wheel 79 is held in tight, frictional contact between idler wheel 85 and plate 83b as well as in co-planar arrangement with work plate 33. Means are provided on pins 87 and 93 to adjust the distance between plates 83a and 83b and to also adjust the friction or resistance to turning of small gear wheel 79.

In one embodiment of this invention, plates 83a and 83b are adjusted such that there is a substantial amount of friction developed between gear wheel 79 and brake plate 83b and idler wheel 85, so that when gear wheel 79 contacts work plate gear teeth 45, the rotational velocity of work plate 33 is quickly reduced to zero.

An idler surface 95 is formed on an upstanding wall 97 formed atop work plate 33 and preferably adjacent to the periphery thereof slightly inboard from gear teeth 45. Wall 97 extends upwardly from work plate 33 except for a portion 99 where it is purposely absent. A spring 101 is connected between pin 93 and chassis 25 to provide bias for brake means 77 against work plate gear teeth 45. During powered rotation of work plate 33, solenoid coil 89 is energized to urge solenoid plunger 91 against pin 93 to move brake means 77 out of contact with work plate 33. When power is cut off from drive motor 31, solenoid coil 89 is de-energized allowing brake means 77 to pivot under bias pressure of spring 101 toward work plate 33. Idler wheel 85 then contacts idler surface 95 and retains gear wheel 79 out of contact with gear teeth 45 located around the periphery of work plate 33. As work plate 33 turns, idler wheel 85 rolls atop idler surface 95 until idler surface 95 terminates at 99. Thereafter, brake means 77 is urged by spring 101 closer toward work plate 33 thereby allowing small gear wheel 79 to engage gear teeth 45 and begin decelerating the rotary motion of work plate 33.

Turning now to FIG. 7, it can be seen that current flows along conductor 103 through a system cut-off switch 105 and then splits into two paths, where conductor 107 directs current through solenoid coil 89 and conductor 109 directs current to one side of drive motor 31. Current through coil 89 passes by conductor 111 to one tap 113 of a normally-closed micro-switch 115 and then by conductor 118 to the other side of drive motor 31. Another conductor 117 carries current from micro-switch tap 113 to push-button switch 73, thence through rheostat 74. Another conductor 119 carries current from rheostat 74 back to another tap 121 of normally-closed switch 115. A separate conductor 123 carries current from the other side of battery 71 to tap 121.

In practice, when the driver closes switch 105 and presses switch 73, current passes from one side of means 71 through conductor 103 and 109 to one side of drive motor 31 and from the other side of means 71 through conductor 123, 119, rheostat 74, switch 73, conductor 117, tap 113, and conductor 118 to the other side of drive motor 31. When work plate 33 and post 63 drive lever 47 off stop 69, an arm 125, extending from switch 115, is released to move said switch into its normally closed configuration. When push button 73 is released, current continues to flow along conductors 103 and 109 to one side of motor 31 and along conductor 123, through switch 115 and along conductor 118 to the other side of motor 31 to allow it to continue to drive lever 47 all the way in a counterclockwise direction to where it snaps back against stop 69. As lever 47 comes to rest against stop 69, it moves switch arm 125 to open switch 115 and stop current flow to motor 31. Brake means 77 simultaneously slows work plate 33 to a stop.

In operation, lever 47 remains in its preset position out of contact with cross-pin 51 mounted to clutch cable 17. When the driver wishes to begin cycling clutch cable 17, he/she presses switch 73 to energize drive motor 31 from power source 71 and cause work plate 33 to rotate. Post 63 contacts lever 47 and pivots it counterclockwise causing pawl 53 to engage cross-pin 51 and pull clutch cable 17 to disengage the clutch. After further rotation of work plate 33 and pivotal movement of lever 47 by post 63, said post reaches notch 65 and passes under and out of contact with lever 47 thereby allowing lever 47 to snap back or quickly rotate clockwise, under the influence of spring 59, to release the pulling action on clutch cable 17. As long as the operator presses switch 73, this oscillatory action of clutch cable 17 will continue. Upon releasing switch 73, work plate 33 will continue to turn until post 63 reaches notch 65 whereupon lever 47 snaps or quickly rotates clockwise to release its pull on clutch cable 17. At the onset of clockwise movement of lever 47, brake shoe 85 is forced or urged by spring 101 into contact with brake wall 91 to aid in decelerating work plate 33 to zero velocity. Power, through switch 103 will allow drive motor 31 to rotate work plate 33 to its preset position. Accordingly, when switch 51 is released, work plate 33 will always rotate to its preset position to insure that clutch cable 17 is released from engagement from lever 53 thereby allowing the clutch to be fully engaged.

Figure 9:
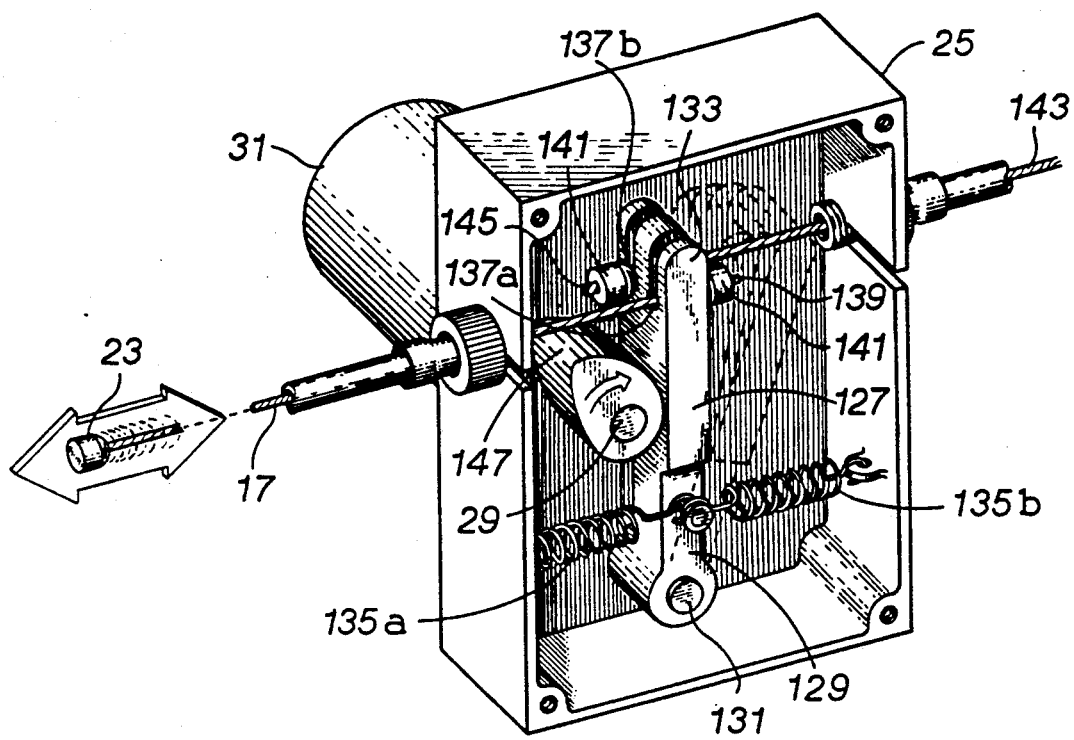
FIG. 9 is a front trimetric illustrative view rotated 90° of another embodiment of the invention, with the cover removed.
Figure 10:
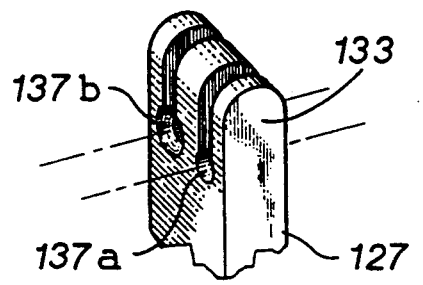
FIG. 10 is an enlarged view of the upper end of the pivot lever, for clarity.

As shown in FIG. 9, another embodiment of this invention involves a lever 127, pivotally mounted in chassis 25 at one end 129 by a shaft 131 so that the other end 133 of lever 127 is free to move in a radius thereabout. A pair of springs 135a and 135b are placed on both sides of lever 127 to bias said lever into a neutral or first position as shown in solid lines in FIG. 9. As shown in FIG. 10, keyed apertures 137a and 137b are formed transversely through lever 127 near lever end 133 preferably at equal distances from shaft 131. Aperture 137a is adapted to slidingly receive the free or terminal end 139 of clutch cable 17. Said terminal end contains a terminal fitting 141, such as a crushed lead split-shot, to prevent cable 17 from pulling out of aperture 137a. Terminal end 139 of cable 17 and fitting 141 are arranged such that cable 17 is held tautly when lever 127 is in its first position.

A second cable 143 is attached to clutch handle 19, passed through keyed aperture 137b and terminated at an end 145 with a similar fitting 141 to prevent said terminal end from pulling out of said aperture. Terminal end 145 of cable 143 and fitting 141 are arranged such that cable 143 is held tautly when lever 127 is in its first position and handle 19 is relaxed into its open position.

A cam lobe 147 is mounted on drive motor shaft 29 adjacent lever 127 for rotary motion thereagainst, when drive motor 31 powers shaft 29 in rotary motion. Cam lobe 147 moves lever 127 about shaft 131 and displaces it to the right as shown in dotted outline in FIG. 9. Such displacement causes lever 127 to pull on cable 17 and disengage the clutch. Continued rotation of cam lobe 147 allows lever 127, through urging by springs 135a and 135b, to move back into its first or neutral position and allow clutch cable 17 to return toward the clutch causing engagement of said clutch. Handle 19 may be squeezed at any time and such action will force cable end 145 to pull lever 127 out of its first position and cause the clutch to be disengaged.

In this embodiment, drive motor 31 is of the stepper motor-type and these type motors can be wired or programmed to stop at any desired angular position of shaft 29. Accordingly, when the driver removes pressure on switch 73, stepper motor 31 will continue to turn until cam lobe allows springs 135a and 135b to urge lever back into its first position.

Figure 11:
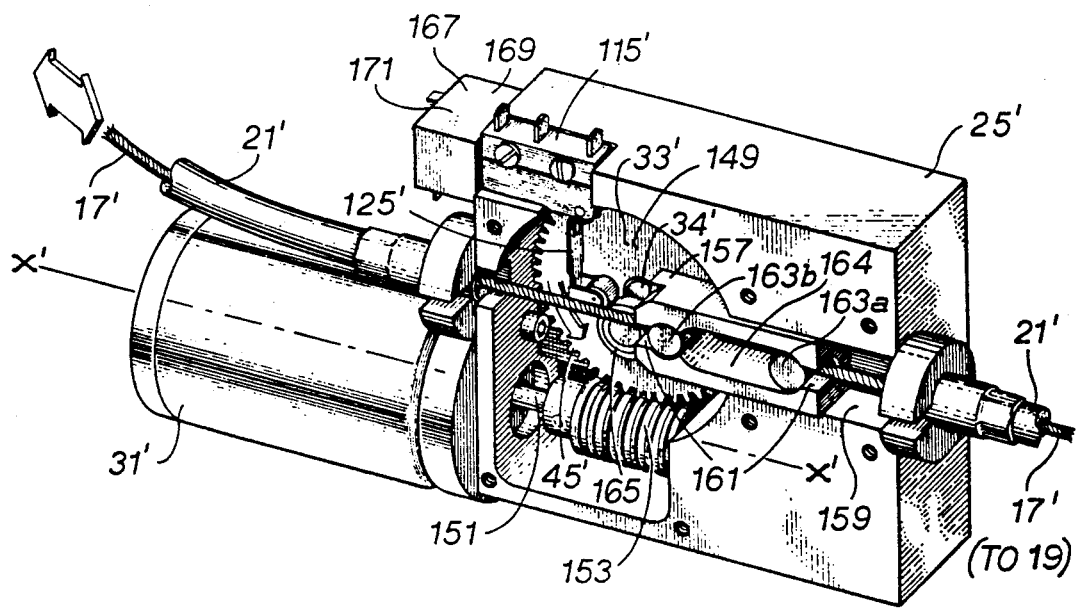
FIG. 11 is a front trimetric illustrative view of yet another embodiment of the invention with the cover removed; and, FIG. 12 is a schematic view of the embodiment shown in FIG. 11.
Figure 12:
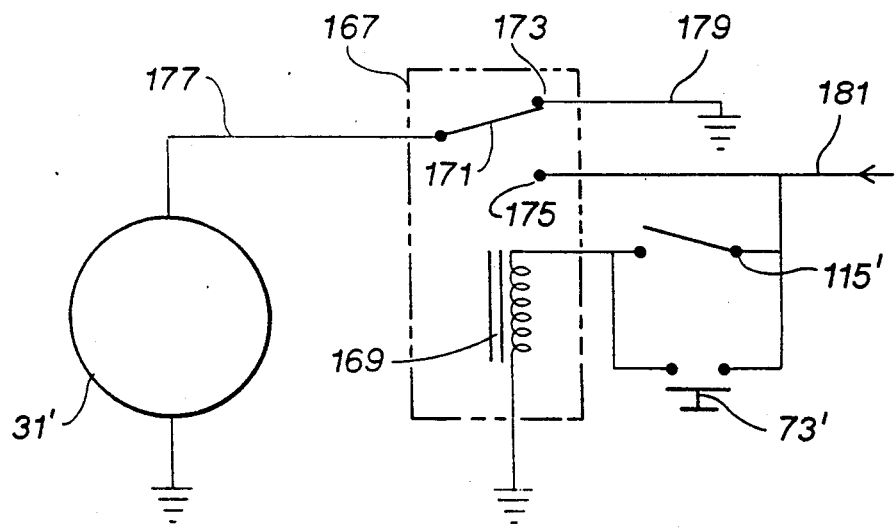

In a still further embodiment, shown in FIGS. 11 and 12, work plate 33' is in the form of a geared drive wheel 149 pivotally supported on a central journal bearing 34' attached to chassis 25'. Drive motor 31', attached to chassis 25', powers a drive shaft 151 in rotational motion about an axis x'—x' on which is mounted a worm gear 153 that is operably interconnected to wheel 149 through a series of gear teeth 45' disposed about the circumference thereof that mesh with the threads on worm gear 153. A piston 157 is mounted in a slot 159 formed in chassis 25' and arranged for sliding, reciprocal movement along a path parallel to cable 17'.

Apertures 161 are formed in the terminal ends of piston 157 for receipt therethrough of the separate ends of cable 17', one end coming from the motorcycle clutch and the other end coming from clutch engaging-/disengaging handle 19 (not shown) respectively, the cable sheath 21' for each cable connected to chassis 25' as shown. Each separate cable end is attached to separate cross-pins 163a and 163b that are received in piston 157. A chamber 164 is formed in piston 157 to allow cross-pin 163a to move interior of piston 157 during the reciprocal movement of the piston to prevent kinking of clutch cable 17' to handle 19. A roller cam 165 is mounted off-center from journal bearing 34' on drive wheel 149 and arranged to contact end of piston 157 as drive wheel 149 is rotated by the turning action of worm gear 153. The powered rotation of drive wheel 149 causes cam 165 to rhythmically or cyclically displace piston 157 in slot 159 toward handle 19 thus cycling the clutch through a repeated engage-disengaged motion.

A holding relay 167 is provided having an electric coil 169 that operates a switch 171 between two positions 173 and 175. When relay 167 is not energized, switch 171 rests in position 173 and grounds the windings of motor 31' through conductors 177 and 179. Electrical power comes in from power means (not shown) through conductor 181. Switch 73' may be pressed by the driver and directs the power into coil 169. This causes switch 171 to actuate and change to position 175 where power is connected to motor 31' through conductors 181 and 177. Normally closed microswitch 115' is located on chassis 25' and is held open by roller cam 165. As work plate 33' moves roller cam 165 in a circular path about bearing 34', cam 165 disengages from arm 125' and allows microswitch 115' to close. This provides a separate path of electrical energy to motor 31'. Should the driver release switch 73', motor 31' would still power work plate 33' and roller cam 165 until roller cam 165 engages arm 125' again on its next cycle. At that time, pressure on arm 125' is restored and switch 115' moves to the open position. When the driver releases switch 73' and microswitch 115' is open, switch 171 immediately moves to position 173 to ground the windings of motor 31' and shut off power to motor 31'. This causes a quick ground out of the electrical energy stored in motor 31' and results in quick stopping of the motor and movement of the other components. This is known as "dynamic loading" or "dynamic braking". Accordingly, motor 31' is able to stop at a pre-set position wherein the clutch cable is released to engage the clutch.

While the invention has been described with reference to a particular embodiment hereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. In an engine-powered wheeled vehicle, having an engine, at least one drive wheel, and a clutch interposed therebetween, said clutch actuated through a clutch cable operated by a moveable engaging/disengaging clutch handle, a clutch oscillator assembly comprising:
   a) a chassis for mounting on the vehicle intermediate the clutch and the clutch handle;
   b) a shaft supported on said chassis for powered rotation about a fixed axis;
   c) switch means for interrupting the power to said shaft to cause controlled rotation thereof; and,
   d) cyclic means in association with said shaft for alternately pulling and releasing said clutch cable as a function of rotation of said shaft.

2. The clutch oscillator assembly of Claim 1 wherein said cyclic means further includes a work plate pivotally mounted on said chassis arranged to be driven by said shaft and further including a lever pivotally mounted on said chassis having one end in releasable contact with the clutch cable.

3. The clutch oscillator assembly of claim 2 wherein said clutch means further includes positional-power shut-off means to cause said work plate to rotate to a pre-set position wherein the clutch cable is released by said lever following termination of power.

4. The clutch oscillator assembly of claim 3 wherein said cyclic means further includes brake means to aid in decelerating the rotation of said work plate.

5. The clutch oscillator assembly of claim 4 wherein said brake means further includes brake-release means to remove said brake means from functioning while said work plate is rotating through a position other than the pre-set position.

6. The clutch oscillator assembly of claim 5 wherein said brake-release means includes a solenoid having a moveable plunger arranged to engage said brake means and hold it out of operation while said work plate is rotating through a position other than the pre-set position.

7. The clutch oscillator assembly of claim 2 wherein said power for said shaft is a drive motor receiving power from an energy source.

8. The clutch oscillator assembly of claim 7 wherein said drive motor is an electric motor, said energy source is a battery pack and includes a normally-opened, single-pole, single-throw electrical switch interposed said electric motor and said battery pack.

9. The clutch oscillator assembly of claim 2 wherein said cyclic means includes a post mounted on said work plate, spaced-apart from said pivotal mounting thereof to create, as said work plate is turned, rhythmic contact between said post with a portion of said lever, to move said lever and cause the clutch cable to be pulled to disengage the clutch, during part of the rotation of said work plate and further including a notch formed in said lever for passage of said post therethrough and out of contact with said lever during another part of the rotation of said work plate to release the clutch cable and allow the clutch to immediately reengage.

10. The clutch oscillator assembly of claim 8 wherein said cyclic means further includes bias means to urge said lever in a reverse direction from the direction to which said lever is driven by said post during part of the rotation of said drive wheel.

11. The clutch oscillator assembly of claim 2 wherein said cyclic means further includes a cross-pin mounted in fixed position on the clutch cable and a split-fingered pawl attached to said lever for engagement with said cross-pin, for urging said cross-pin and clutch cable away from the clutch to disengage the clutch and yet allow unrestricted movement of the clutch cable by the engaging/disengaging clutch handle.

12. The clutch oscillator assembly of claim 2 wherein said work plate includes a series of gear teeth formed thereon for engagement with gear teeth formed on said shaft to drive the rotation of said work plate as a function of shaft rotation.

13. The clutch oscillator assembly of claim 12 wherein said work plate is circular and said gear teeth are formed about the periphery of said work plate.

14. The clutch oscillator assembly of claim 3 wherein said positional-power shut-off means includes a normally-closed electric switch having a switch operating arm extending therefrom for engagement with said lever when said lever releases its pull on the clutch cable to disrupt power to said shaft and allow said work plate to rotate into the pre-set position.

15. The clutch oscillator assembly of claim 1 wherein said switch means further includes a rheostat in said power line for adjusting the power delivered to said shaft.

16. The clutch oscillator assembly of claim 1 wherein said cyclic means comprises:
   a) a lever of terminal length pivotally mounted in said chassis at one end to restrict the movement of the other terminal end thereof in radial motion thereabout;
   b) bias means attached to said lever to urge it into a first position, said lever having formed transversely therethrough a pair of apertures spaced apart from said pivotal mounting and wherein the clutch cable is slidingly received in one of said apertures, through one side of said lever and terminated on the other side of said lever from said clutch by a fitting that is larger in size than said aperture so that said cable is tautly held by said lever when in said first position;
   c) a second clutch cable slidingly received in the other of said apertures and terminated on the opposite side of said lever from the engaging/disengaging clutch handle by a fitting that is larger in size than said aperture so that cable is tautly held by said lever when in said first position; and,
   d) a cam lobe attached to said shaft adjacent said lever for rotary motion thereagainst when powered for rotary motion to displace said lever from its first position and pull on the clutch cable and disengage the clutch and further, under continued rotation to allow said lever, through urging by said bias means, to move back into said first position and allow the clutch cable to return toward the clutch causing engagement of said clutch.

17. The clutch oscillator assembly of claim 16 wherein said pair of apertures formed transversely through said lever are arranged spaced-apart at equal distances from said pivotal mounting 18. The clutch oscillator assembly of claim 1 further including a geared drive wheel centrally and pivotally supported for rotary motion on said chassis and wherein said cyclic means comprises:
   a) a gear wheel mounted on said shaft to turn said drive wheel;
   b) a piston slidably mounted for reciprocal motion along a path parallel to a portion of said clutch cable;
   c) means for receiving and retaining said cable in connection with said piston;
   d) means for biasing said cable toward clutch engagement; and,
   e) cam means mounted off-center on said drive wheel adapted to move said piston against said bias to cause said clutch to disengage and engage said clutch in a cyclic rhythm as a function of rotation of said drive wheel.

19. The clutch oscillator assembly of claim 18 wherein said means for receiving and holding said cable in said piston includes a pair of apertures for receipt therein of said clutch cable and a pair of cross-pins, one attached to each end of said cable received in said piston to retain said cable ends in said piston.

20. The clutch oscillator assembly of claim 19 further including a chamber formed in said piston to allow movement of said cross-pin attached to said cable coming from said clutch handle to prevent kinking of said cable during cycling of said clutch.

21. The clutch oscillator assembly of claim 18 further including a holding relay acting in cooperation with said switch means for maintaining power to said drive wheel, to continually turn said drive wheel and cause said clutch to disengage and engage in cyclic rhythm until both the driver has released said switch means and said drive wheel has rotated to a pre-set position wherein the clutch cable is released by said piston moving means.

22. The clutch oscillator assembly of claim 18 wherein said gear wheel is a worm gear wheel.

* * * * *